(12) United States Patent
Wu et al.

(10) Patent No.: US 11,368,288 B2
(45) Date of Patent: Jun. 21, 2022

(54) APPARATUS AND METHOD OF LIGHTWEIGHT COMMUNICATION PROTOCOLS BETWEEN MULTIPLE BLOCKCHAINS

(71) Applicant: Hong Kong Applied Science and Technology Research Institute Company Limited, Hong Kong (HK)

(72) Inventors: Shangru Wu, Shenzhen (CN); Haihua Zhang, Beijing (CN); Xingxia Zhang, Hong Kong (HK); Ruoqing Zhang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 111 days.

(21) Appl. No.: 17/100,790

(22) Filed: Nov. 20, 2020

(65) Prior Publication Data
US 2022/0166602 A1   May 26, 2022

(51) Int. Cl.
  *H04L 29/06* (2006.01)
  *H04L 9/06* (2006.01)
  *H04L 9/32* (2006.01)
(52) U.S. Cl.
  CPC .......... *H04L 9/0637* (2013.01); *H04L 9/0643* (2013.01); *H04L 9/3242* (2013.01); *H04L 9/3247* (2013.01)
(58) Field of Classification Search
  None
  See application file for complete search history.

(56) References Cited

U.S. PATENT DOCUMENTS

| 10,298,395 B1 | 5/2019 | Schiatti et al. |
| 10,615,964 B2 | 4/2020 | Qiu |

(Continued)

FOREIGN PATENT DOCUMENTS

| CN | 109905368 A | * | 6/2019 |
| CN | 109905368 A |   | 6/2019 |

(Continued)

OTHER PUBLICATIONS

International Search Report and Written Opinion of corresponding PCT Patent Application No. PCT/CN2020/131455 dated Aug. 9, 2021.

(Continued)

*Primary Examiner* — Andrew J Steinle
(74) *Attorney, Agent, or Firm* — Idea Intellectual Limited; Margaret A. Burke; Sam T. Yip (57) ABSTRACT

A method for inter-blockchain communication, comprising: receiving from a sender node in a sender blockchain a data message for transmission to a receiver node in a receiver blockchain; encrypt and encapsulate by an encryption module the data message into an event, wherein the event comprising an exposed header containing information for routing the event through the blockchains and identifying the sender and the receiver nodes; broadcasting the event to a communication bridge comprising multiple bridge nodes; transferring the event through the bridge nodes to an event exchange module of the receiver blockchain; validating the event by a validation module; decrypting and decapsulating the validated event by a decryption module into a decrypted data message; and recording the decrypted data message into the receiver blockchain ledger for reading by the receiver node. The multiple bridge nodes ensure redundancy for the reliable delivery of events in the inter-blockchain communication.

10 Claims, 6 Drawing Sheets

(56) References Cited

U.S. PATENT DOCUMENTS

| | | |
|---|---|---|
| 2016/0330034 A1 | 11/2016 | Back et al. |
| 2017/0046698 A1* | 2/2017 | Haldenby ............. H04L 9/0894 |
| 2018/0113752 A1 | 4/2018 | Derbakova et al. |
| 2019/0288858 A1 | 9/2019 | Chow et al. |
| 2020/0106610 A1 | 4/2020 | Doddavula et al. |
| 2020/0177387 A1 | 6/2020 | Qiu |

FOREIGN PATENT DOCUMENTS

| | | | | |
|---|---|---|---|---|
| CN | 111200641 A | * | 5/2020 | |
| CN | 111200641 A | | 5/2020 | |
| CN | 111416808 A | * | 7/2020 | ........... G06F 16/258 |
| CN | 111416808 A | | 7/2020 | |
| JP | 2019536380 A | | 12/2019 | |
| WO | 2019213781 A1 | | 11/2019 | |

OTHER PUBLICATIONS

Vasilios A. Siris et al., "Interledger Approaches", IEEE Access, vol. 7, 2019, p. 89948-89966.

\* cited by examiner

APPARATUS AND METHOD OF LIGHTWEIGHT COMMUNICATION PROTOCOLS BETWEEN MULTIPLE BLOCKCHAINS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of blockchain technologies, and in particular, to cross-blockchain communication and interaction techniques and devices. More specifically, the present invention relates to techniques and devices for enabling lightweight communication protocols for inter-blockchain communication without sacrificing privacy and security.

BACKGROUND OF THE INVENTION

A blockchain is a decentralized and distributed data structure, storage, and management system implemented in a computing platform comprising peer-to-peer (P2P) and distributed electronic ledgers kept and maintained in a plurality of computing devices. In general, a ledger is made up of logical blocks, which in turn are made up of transaction. Each transaction is a data record that encodes the transfer of a digital asset or resource between participants in the blockchain system and includes at least one input and output. Each block contains the hash of the previous block, and all of the blocks are chained together to create a permanent blockchain. For a permanent blockchain, from the time of its inception, the transaction records, which have been written to the blockchain, are unalterable.

Blockchains form the bedrock for cryptocurrencies, such as Bitcoin (BTC), Ethereum (ETH), Tether, XRP, and the likes. Besides digital currency, which is one of many financial applications readily suited for blockchain adoption, blockchains are increasingly being utilized in various social, commercial, and industrial applications such as asset trading, medical record sharing, digital entertainment sharing and royalty collection, contract management, and public voting. Traditionally, each of these applications has been utilizing a blockchain that is largely independent and isolated from each other. However, any one common human activity often involves more than one of these applications in its performance. Thus, there is a need for data communications and interactions between different blockchains in order to facilitate the seamless handling of many human activities.

It is known to the inventors that currently existed four solutions on inter-blockchain communications. There four solutions are referred to as Relay, Sidechains, Blockchain Routers, and Smart Contracts. Nevertheless, each of these solutions has its own limitations. In the Relay solution, a trusted third party ("Relayer") is employed to carry data messages between a first blockchain and a second blockchain. This places the assumption on the Relayer that it is trustworthy and reliable in always properly relaying the correct messages to and from the correct blockchain. BTCRelay and PeaceRelay are such examples.

In the Sidechains solution, a third blockchain is needed to connect a first blockchain and a second blockchain. It is necessary to trust the entirety of the third blockchain. Besides, it takes a rather large effort and much resource to build a separate third blockchain just to facilitate inter-blockchain communications. Cosmos and Polkadot are such examples.

In Blockchain Routers solution, a number of blockchain nodes are designated to act as routers to transmit requests between multiple blockchains. Again, large effort is required to set up the special router nodes and it requires real-time routing algorithms for load balancing. Anlink is such example.

Smart Contracts can be applied to create interoperable protocols between blockchains. However, this solution relies on special blockchain architecture (e.g. satellite chain) or requires the deployment of additional connector chain code, in turn the modification of the blockchains engaged in intercommunications. Also, most solutions use HTTP requests thus further require some additional mechanisms to ensure the idempotency of each request. Provable is such example.

Further, transmitting sensitive information such as trade secrets or confidential documents between multiple parties and blockchains always inherits the potential risk of the information being tampered with, corrupted, or discarded maliciously and/or accidentally. Therefore, there is a need for secured data and document exchange between permission based blockchains that is less expensive and resource intensive than the current solutions.

SUMMARY OF THE INVENTION

One objective of the present invention is to provide a lightweight communication protocol for inter-blockchain communication that does not require a trusted third party or extensive modification to the original blockchain platform. Another objective is to provide such a lightweight communication protocol that applies cryptographic techniques to ensure security and privacy during data message transmission between blockchains. Yet another objective is to provide such a lightweight communication protocol that utilizes a generic communication bridge ensuring redundancy and reliability.

In accordance to various embodiments of the present invention, provided are logical execution modules comprising: an encryption module, an event exchange module, a communication bridge, a validation module, and a decryption module. The logical execution modules, together, are configured to execute an inter-blockchain data message transmission comprising: receiving by the encryption module of a sender blockchain a data message for transmission to the receiver blockchain from a sender; encrypt and encapsulate by the encryption module the data message into an event; broadcasting the event to a communication bridge; listening for broadcasts of the events and receiving the event by one or more bridge nodes of the communication bridge; transferring the event through the one or more bridge nodes of the communication bridge to the event exchange module of the receiver blockchain; receiving the event by the event exchange module of the second blockchain; validating the event by the validation module of the second blockchain; if the event is valid, decrypting and decapsulate by the decryption module of the second blockchain into a decrypted data message; recording the decrypted data message into the ledger of the receiver blockchain and be read by the receiver.

BRIEF DESCRIPTION OF THE DRAWINGS

Embodiments of the invention are described in more details hereinafter with reference to the drawings, in which.

DETAILED DESCRIPTION

In the following description, apparatuses and methods of lightweight communication protocols for inter-blockchain communication and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
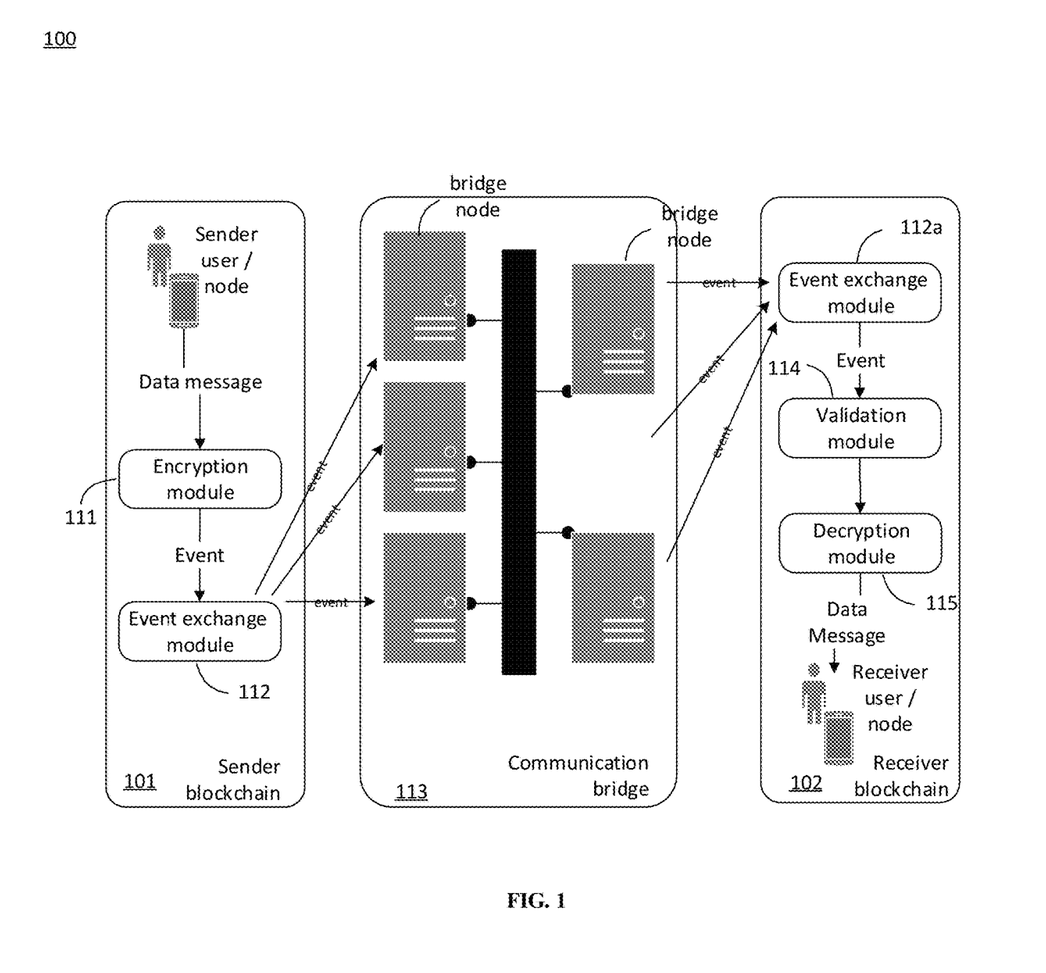
FIG. 1 depicts a block diagram illustrating the logical modules and data flow of the apparatus for inter-blockchain communication in a multi-blockchain infrastructure in accordance with one embodiment of the present invention.

The present invention is further described below with reference to FIG. 1. In accordance to various embodiments of the present invention, a multi-blockchain infrastructure 100 having a first blockchain (or sender blockchain) 101 and a second blockchain (or receiver blockchain) 102 participating in inter-blockchain communications, wherein the inter-blockchain communications are enabled by the inclusion of a set of logical execution modules in the multi blockchain infrastructure 100. In order to facilitate a two-way inter-blockchain communication, each of the blockchain in the multiple blockchain infrastructure 100 is to include a complete set of the logical execution modules.

The logical execution modules comprise: an encryption module 111, an event exchange module 112, a communication bridge 113, a validation module 114, and a decryption module 115. The logical execution modules, together, are configured to execute an inter-blockchain data message transmission comprising: receiving by the encryption module 111 of the first blockchain 101 a data message for transmission to the second blockchain 102 from a sender user (or a sender node) in the first blockchain 101; encrypt and encapsulate by the encryption module 111 the data message into an event; broadcasting the event by the event exchange module 112 of the first blockchain 101; listening for broadcasts of the events and receiving the event by one or more bridge nodes of the communication bridge 113; transferring the event through the one or more bridge nodes of the communication bridge 113 to the event exchange module 112a of the second blockchain 102; receiving the event by the event exchange module 112a of the second blockchain 102; validating the event by the validation module 114 of the second blockchain 102; if the event is valid, decrypting and decapsulate by the decryption module 115 of the second blockchain 102 into a decrypted data message; recording the decrypted data message into the ledger of the second blockchain 102 and be read by the receiver user (or receiver node).

In one embodiment, the event is generated by a smart contract. The event has a specific data format comprises at least an exposed header containing information necessary for the routing of the event through the blockchain networks in the multi-blockchain infrastructure 100 and for its validation upon delivery.

Figure 2:
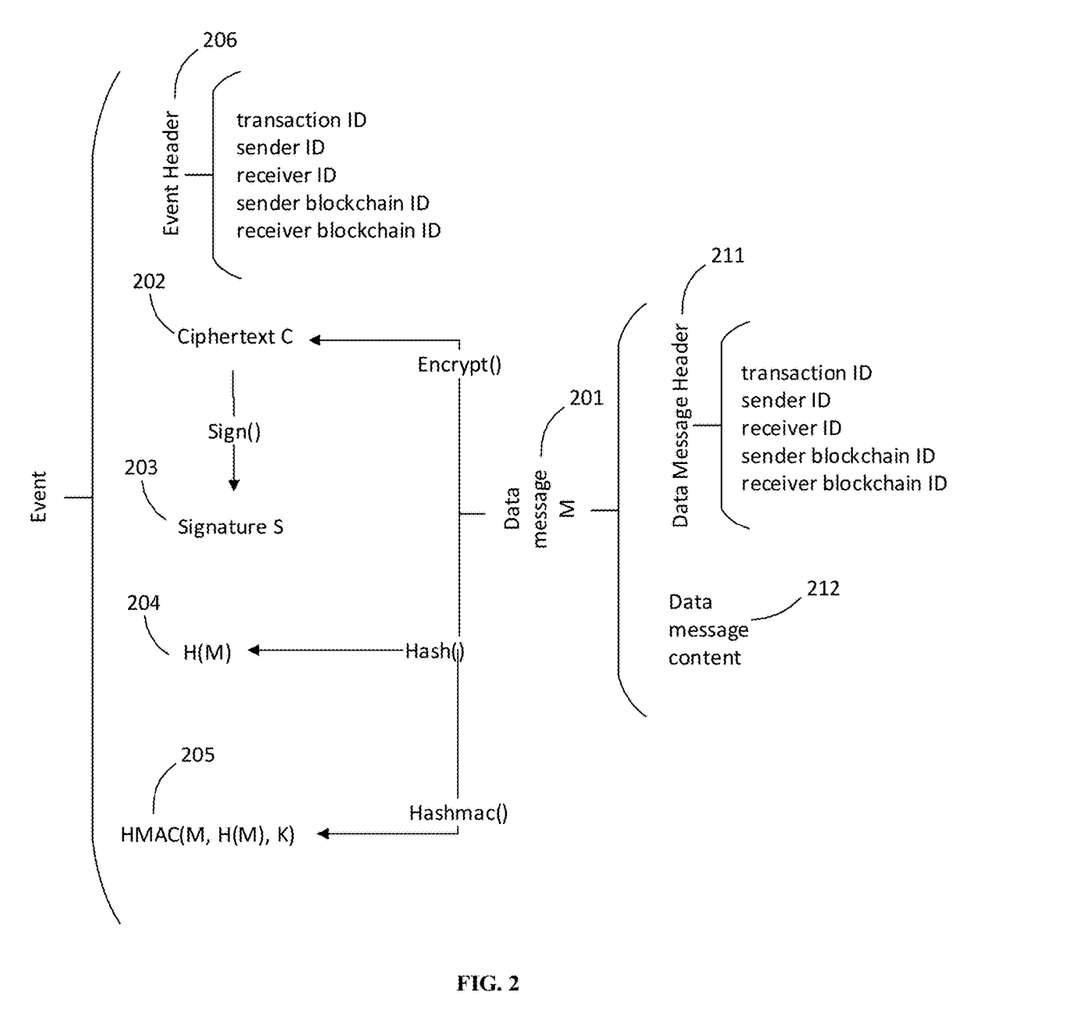
FIG. 2 illustrates the data structure of an event supported by under the inter-blockchain communication protocol in accordance with one embodiment of the present invention.

The present invention is further described below with reference to FIG. 2. In one embodiment, the encryption module 111 is implemented as specially configured machine instructions being executed in one or more computer processors of one or more dedicated servers or one or more nodes (e.g. the sender node) of each of the blockchains in the multiple blockchain infrastructure 100. To generate an event from a data message to be transmitted from one blockchain to another, the encryption module 111 is configured to execute an encryption and encapsulation process comprising: receiving the data message, M 201, wherein M 201 comprises a data message header 211 and a data body 212; hashing M 201 to generate a hash code, Hash(M) 204; performing a HMAC operation on the data message 201 and Hash(M) 204 with a HMAC key, K, to generate a keyed-hash message authentication code, HMAC(M, Hash(M), K) 205; encrypting M 201 using an one-time use symmetric key to generate a ciphertext, C 202; digital signing C 202 with a signature key to generate a signature text, S 203; concatenating an event header 206 with C 202, S 203, Hash(M) 204, and HMAC(M, Hash(M), K) 205 to generate the event, which can be represented by: event=[ehd, C, S, H, HM]. In accordance to one embodiment, the inter-blockchain communication protocol supports the data structure of an event as illustrated in FIG. 2. Other data structures can readily be adopted by an ordinarily skilled person in the art without undue experimentation or deviation from the spirit of the present invention.

In one embodiment, the sender user (or sender node) and receiver user (or receiver node) exchange and confirm the HMAC key, K, in advance of the inter-blockchain communication takes place. In one embodiment, the HMAC key, K, is a natural-language character string describing the purpose of the hash operation. As such, it ensures that for different hash purposes, the results of the HMAC operations are different. Furthermore, the HMAC key, K, may also offer a message authentication function to a certain extent, owing to it needs to be shared securely by the sender user (or sender node) and the receiver user (or receiver node) before engaging in inter-blockchain communication.

In one embodiment, each of the data message header and event header comprises at least a transaction identifier, sender identifier corresponding to the sender user (or sender node), receiver identifier corresponding to the receiver user (or receiver node), sender blockchain identifier, and receiver blockchain identifier. In one embodiment, the event header is an identical copy of the data message header. In one embodiment, transaction identifier is a multi-blockchain infrastructure-wide globally unique identifier; in another embodiment, it is a sender blockchain-wide globally unique identifier.

In one embodiment, the encryption and decryption of the data message are accomplished by using a symmetric key algorithm with a one-time use key and that all blockchains in the multi-blockchain infrastructure 100 have the same mechanism. Other methods and mechanisms in cryptography can be readily adopted by an ordinarily skilled person in the art without undue experimentation or deviation from the spirit of the present invention.

In one embodiment, the digital signing of the ciphertext to generate a signature text is accomplished by using an asymmetric key algorithm with a public-private key pair for signature, where the ciphertext is signed (or encrypt) using the sender user (or sender node)'s private signature key and the signature text is verified by using the sender user (or sender node)'s public signature key to reverse-sign (or decrypt) the signature text. Other methods and mechanisms can readily be adopted by an ordinarily skilled person in the art without undue experimentation or deviation from the spirit of the present invention.

In various embodiments, all cryptographic computation keys used in the inter-blockchain communication protocol, including the one-time use symmetric key used in the encryption and decryption of the data messages and the HMAC key, K, are specified and exchanged securely between the sender user (or sender node) and the receiver user (or receiver node) in advance and stored securely in the participating blockchain nodes and the modules. The participating blockchains adopt the same cryptographic standards. The communicating parties, the sender user (or sender node) and the receiver user (or receiver node), are assigned the appropriate public and private keys by a trustworthy certificate authority (CA), which also functions to respond to key queries.

Figure 3:
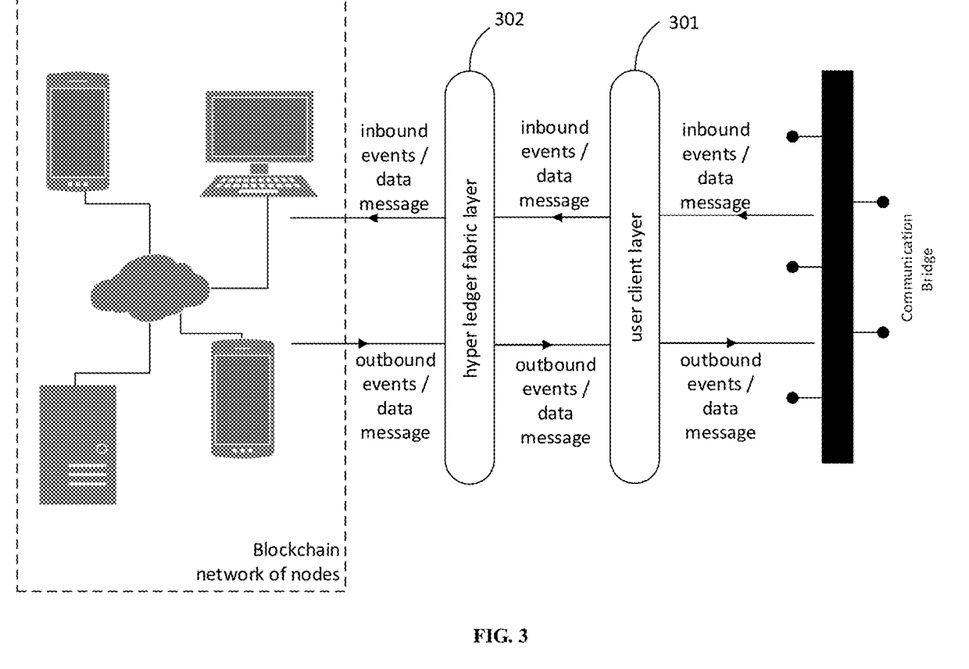
FIG. 3 depicts a block diagram illustrating the logical module of event exchange module and its data flow of the apparatus for inter-blockchain communication in a multi-blockchain infrastructure.

The present invention is further described below with reference to FIG. 3. In one embodiment, the event exchange module 112 comprises one or more sets of specially configured machine instructions each set being executed in one or more computer processors of one or more dedicated servers or one or more nodes of each of the blockchains in the multiple blockchain infrastructure 100. The sets of specially configured machine instructions may be logically divided into two layers: a user client layer 301 and a hyper ledger fabric layer 302, which may be components of the blockchain SDK.

In the sending of data messages from one blockchain to another, the event exchange module 112 causes and controls of the routing of a data message from the sender user (or sender node) to the encryption module 111 to be encrypted and encapsulated into an event. The event exchange module 112 then causes the event to be routed through its hyper ledger fabric layer 302 and user client layer 301 and finally be broadcasted to the communication bridge 113.

In the receiving of data messages by one blockchain from another, the event exchange module 112a causes and controls of the routing of an event received from the communication bridge 113 by its user client layer 301 and through its hyper ledger fabric layer 302 to the validation module 114 and then the decryption module 115. After the event is validated, decapsulated and decrypted into the decrypted data message, the decrypted data message is received and recorded into the ledger of the receiver blockchain and the receiver user (or receiver node) reads the decrypted data message.

By reading and processing the information in the header of the data message 201 and the header of the event, the event exchange module 112 is able to provide the proper routings of the data message 201 and the event through the network of nodes of the blockchains.

Figure 4:
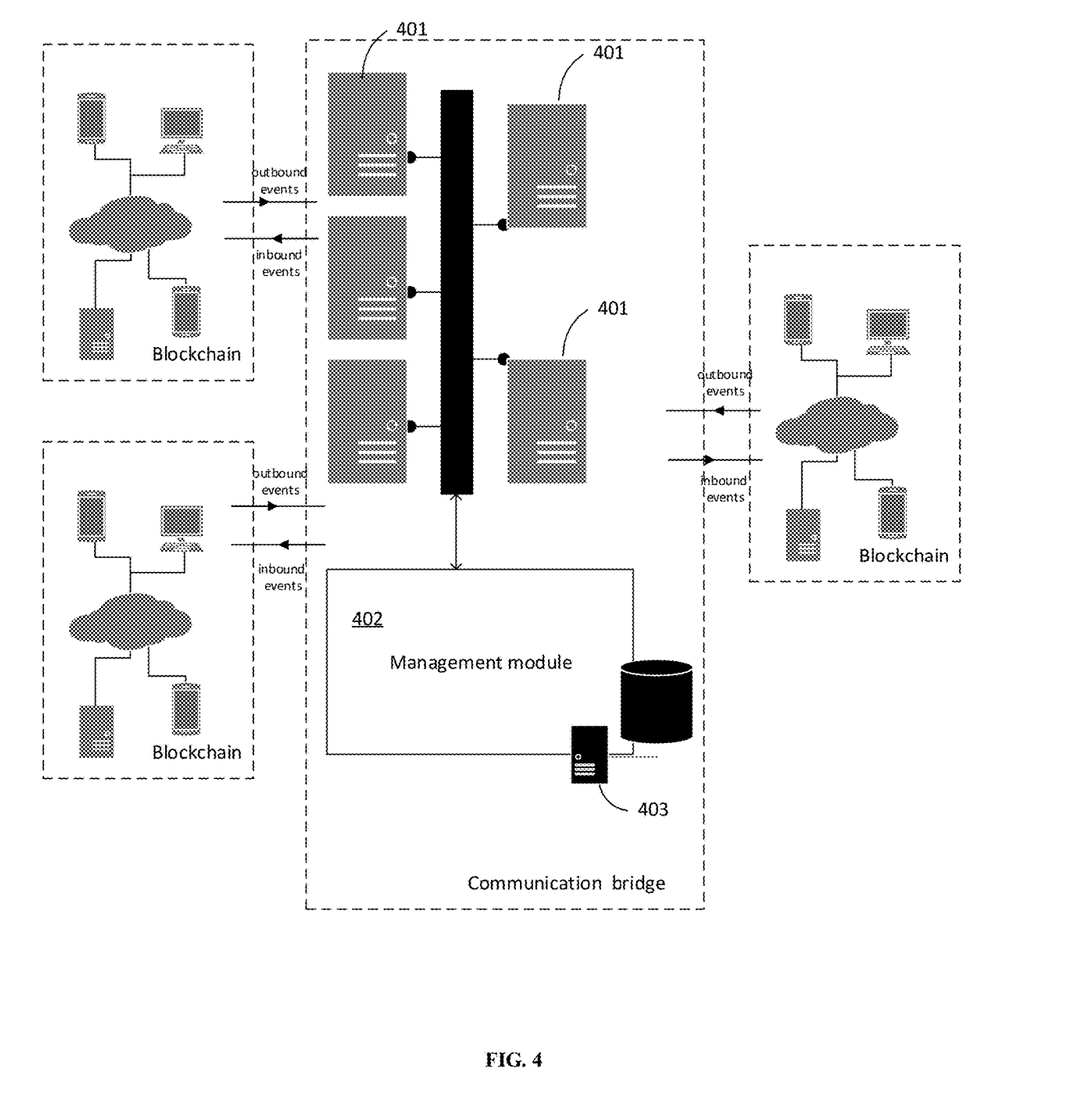
FIG. 4 depicts a block diagram illustrating the logical module of communication bridge and its data flow of the apparatus for inter-blockchain communication in a multi-blockchain infrastructure.

The present invention is further described below with reference to FIG. 4. In one embodiment, the communication bridge 113 comprises one or more sets of specially configured machine instructions each set being executed in one or more computer processors of one or more dedicated servers, and/or one or more dedicated bridge nodes 401. In accordance to a preferred embodiment, the communication bridge 113 comprises a plurality of dedicated bridge nodes 401 such that at any one point of time there are more than one bridge nodes listening for broadcasts of events and performing the transfers of events. This way, redundancy is ensured for the reliable delivery of events in the inter-blockchain communication. The communication bridge 113 is configured to be in connections with all blockchains in the multi-blockchain infrastructure 100 via data communication links; continuously listen for the broadcasts of events from all connected blockchains; receive an event broadcasted from a sender blockchain; and transfer the received event to the receiver blockchain according to the header information in the received event.

The communication bridge 113 further comprises a logical management module 402, which may be implemented as one or more sets of specially configured machine instructions each set being executed in one or more computer processors of one or more dedicated servers 403, one or more dedicated bridge nodes 401. The management module 402 is configured to monitor and control the bridge nodes 401 by broadcasting control command data messages to the bridge nodes 401 and listening for and receiving "heartbeat" data messages replied by each of the bridge nodes 401.

In one embodiment, the validation module 114 is implemented as specially configured machine instructions being executed in one or more computer processors of one or more dedicated servers or one or more nodes of each of the blockchains in the multiple blockchain infrastructure 100. To validate an event received from the communication bridge 113, validation module 114 is configured to execute an event validation process.

Figure 5:
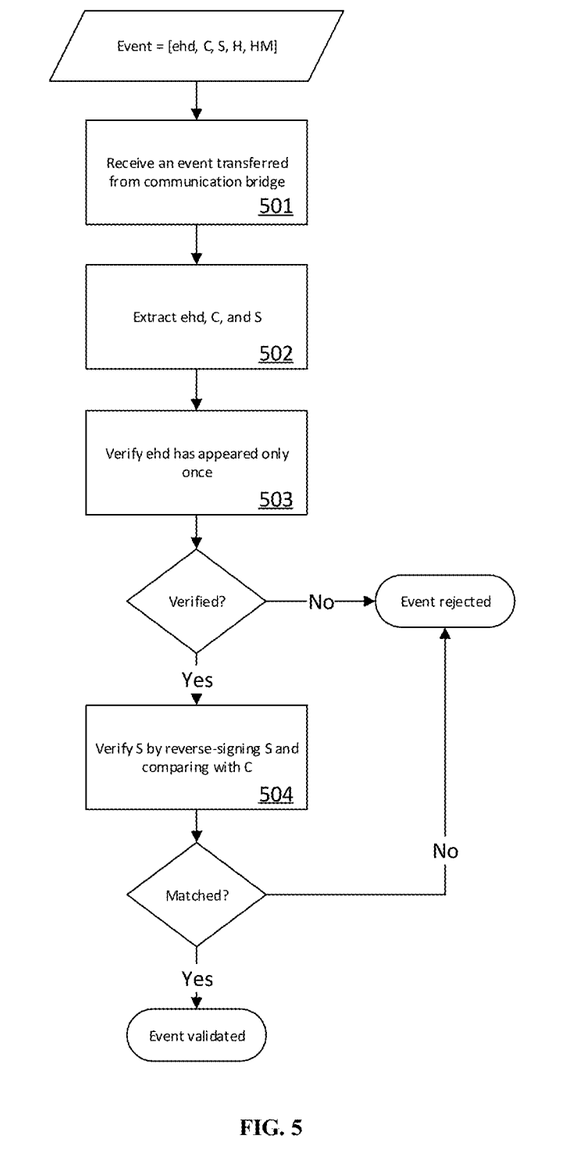
FIG. 5 depicts a flowchart of an event validation process in accordance with one embodiment of the present invention.

The present invention is further described below with reference to FIG. 5. The event validation process comprising: 501 receiving an event transferred from the communication bridge 113 as routed by the event exchange module 112a; 502 extracting the event header, the ciphertext, and signature text from the event received; 503 determining whether the event is received for the first time by comparing the transaction identifier or the combination of the transaction identifier and the sender blockchain identifier in the event header with the ones received previously, and if there is a match, the event is rejected to ensure idempotency, else the event validation process proceeds; 504 verifying the extracted signature text in the event using the sender user (or sender node)'s public signature key to reverse-sign (or decrypt) the signature text and comparing the result with the extracted ciphertext in the event, and if there is a match, the event is validated, else the event is rejected for being invalid or having been tampered with. The validation module 114 preserves the headers and payloads of validated events in archive for idempotency check.

Figure 6:
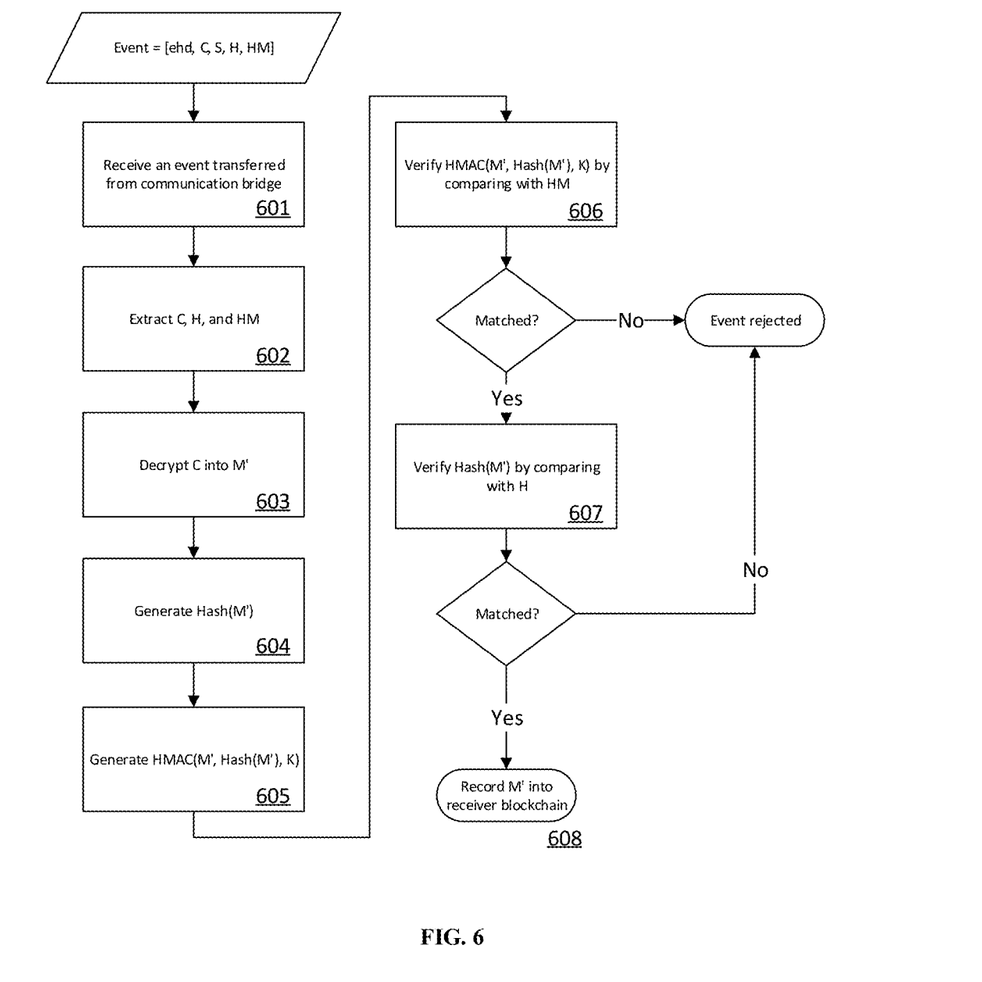
FIG. 6 depicts a flowchart of a data message decryption and decapsulation process in accordance with one embodiment of the present invention.

The present invention is further described below with reference to FIG. 6. In one embodiment, the decryption module 115 is implemented as specially configured machine instructions being executed in one or more computer processors of one or more dedicated servers or one or more nodes (e.g. receiver node) of each of the blockchains in the multiple blockchain infrastructure 100. To decrypt and decapsulate a validated event, the decryption module 115 is configured to execute a decryption and decapsulation process comprising: 601 receiving the validated event from the validation module 114; 602 extracting from the validated event the ciphertext, C, the hash code, Hash(M), and the keyed-hash message authentication code, HMAC(M, Hash (M), K); 603 decrypting the extracted ciphertext using the receiver user (or receiver node)'s symmetric key to generate a decrypted data message, M', and if the decryption fails, the validated event is rejected for being invalid or having been tampered with, else proceeds with the decryption and decapsulation process; 604 hashing M' to generate a hash of the decrypted data message, Hash(M'); 605 performing a HMAC operation on M' and Hash(M') with a HMAC key, K, to generate a keyed-hash message authentication code, HMAC(M', Hash(M'), K); 606 verifying HMAC(M', Hash (M'), K) by comparing it with the extracted HMAC(M, Hash(M), K), and if they are different, the event is rejected for being invalid or having been tampered with, else proceeds with the decryption and decapsulation process; 607 verifying Hash(M') by comparing it with the extracted Hash(M), and if they are different, the event is rejected for being invalid or having been tampered with, else proceeds with the decryption and decapsulation process; 608 the decrypted data message, M' is recorded into the ledger of the receiver blockchain and be read by the receiver user (or receiver node).

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for inter-blockchain communication, comprising:
   receiving from a sender node in a sender blockchain a data message for transmission to a receiver node in a receiver blockchain;
   encrypt and encapsulate by an encryption module the data message into an event, wherein the event comprising an exposed header containing information for routing the event from the sender blockchain to the receiver blockchain and identifying the sender node and the receiver node;
   broadcasting the event to a communication bridge;
   listening for broadcasts of events and receiving the event by one or more bridge nodes of the communication bridge;
   transferring the event through the one or more bridge nodes of the communication bridge to an event exchange module of the receiver blockchain;
   receiving the event by an event exchange module of the receiver blockchain;
   validating the event by a validation module, and rejecting the event if the event is invalid;
   decrypting and decapsulating the validated event by a decryption module into a decrypted data message; and
   recording the decrypted data message into the receiver blockchain ledger for reading by the receiver node.

2. The method of claim 1,
   wherein the communication bridge comprises a plurality of bridge nodes such that at any one point of time there are more than one bridge nodes listening for the broadcasts of events and performing transfers of events.

3. The method of claim 1,
   wherein the data message comprises a header and a content;
   wherein the header comprises a transaction identifier, a sender identifier corresponding to the sender node, a receiver identifier corresponding to the receiver node, the sender blockchain identifier, and the receiver blockchain identifier.

4. The method of claim 1,
   wherein the event comprises a header, a ciphertext, a signature text, a hash code, and a keyed-hash message authentication code; and
   wherein the header comprises a transaction identifier, a sender identifier corresponding to the sender node, a receiver identifier corresponding to the receiver node, the sender blockchain identifier, and the receiver blockchain identifier.

5. The method of claim 4,
   wherein the hash code is generated by performing a hash operation on the data message;
   wherein the keyed-hash message authentication code is generated by performing a HMAC operation on data message and the hash code with a HMAC key wherein the ciphertext is generated by performing an encryption operation on the data message with an one-time use symmetric key; and wherein the signature text is generated by performing an encryption operation on the ciphertext with the sender node's private signature key.

6. The method of claim 1,
wherein the validation of the event by the validation module comprising:
  extracting the header, a ciphertext, a signature text from the event;
  determining whether the event is received for first time by comparing a transaction identifier or a combination of the transaction identifier and a sender blockchain identifier in the header with ones received previously, and if there is a match, the event is rejected for being invalid to ensure idempotency; and
  verifying the extracted signature text in the event using the sender node's public signature key to decrypt the signature text and comparing its result with the extracted ciphertext in the event, and if there is a match, the event is validated, else the event is rejected.

7. The method of claim 1,
wherein the decryption and decapsulation of the validated event comprising:
  extracting from the event a ciphertext, a hash code, and a keyed-hash message authentication code;
  decrypting the extracted ciphertext using an one-time use symmetric key to generate a decrypted data message, and if the decryption fails, the event is rejected;
  performing a hash operation on the decrypted data message to generate a hash code;
  performing a HMAC operation on the decrypted data message and the generated hash code with a HMAC key to generate a keyed-hash message authentication code;
  verifying the generated keyed-hash message authentication code by comparing it with the extracted keyed-hash message authentication code, and if they are different, the event is rejected;
  verifying the generated hash code by comparing it with the extracted hash code, and if they are different, the event is rejected; and
  outputting the decrypted data message.

8. A method for inter-blockchain communication, comprising:
  receiving an event by an event exchange module of a receiver blockchain, wherein the event comprising:
    an exposed header containing information for routing the event from the sender blockchain to the receiver blockchain and identifying the sender node and receiver node; and
    a data message sent from a sender node in a sender blockchain;
  validating the event by a validation module, comprising:
    verifying the event is received for first time to ensure idempotency; and
    verifying a signature in the event to ensure the event is not tampered with;
  decrypting and decapsulate by a decryption module into a decrypted data message; and
  recording the decrypted data message into the receiver blockchain ledger for reading by the receiver node.

9. The method of claim 8,
wherein the validation of the event by the validation module comprising:
  extracting the header, a ciphertext, a signature text from the event;
  determining whether the event is received for first time by comparing a transaction identifier or a combination of the transaction identifier and a sender blockchain identifier in the header with ones received previously, and if there is a match, the event is rejected for being invalid to ensure idempotency; and
  verifying the extracted signature text in the event using the sender node's public signature key to decrypt the signature text and comparing its result with the extracted ciphertext in the event, and if there is a match, the event is validated, else the event is rejected.

10. The method of claim 8,
wherein the decryption and decapsulation of the validated event comprising:
  extracting from the event a ciphertext, a hash code, and a keyed-hash message authentication code;
  decrypting the extracted ciphertext using an one-time use symmetric key to generate a decrypted data message, and if the decryption fails, the event is rejected;
  performing a hash operation on the decrypted data message to generate a hash code;
  performing a HMAC operation on the decrypted data message and the generated hash code with a HMAC key to generate a keyed-hash message authentication code;
  verifying the generated keyed-hash message authentication code by comparing it with the extracted keyed-hash message authentication code, and if they are different, the event is rejected;
  verifying the generated hash code by comparing it with the extracted hash code, and if they are different, the event is rejected; and
  outputting the decrypted data message.

* * * * *